(12) United States Patent
Harney et al.

(10) Patent No.: US 8,970,607 B2
(45) Date of Patent: *Mar. 3, 2015

(54) RUN-TIME ALLOCATION OF FUNCTIONS TO A HARDWARE ACCELERATOR

(71) Applicant: International Business Machines Corporation, Armonk, NY (US)

(72) Inventors: Raymond K. Harney, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/710,278

(22) Filed: Dec. 10, 2012

(65) Prior Publication Data

US 2013/0104143 A1    Apr. 25, 2013

Related U.S. Application Data

(63) Continuation of application No. 12/972,710, filed on Dec. 20, 2010.

(51) Int. Cl.
  *G06F 15/16*    (2006.01)
  *G06F 9/46*    (2006.01)
  *G06F 9/50*    (2006.01)
  *G06T 1/20*    (2006.01)

(52) U.S. Cl.
  CPC ............... *G06F 9/5011* (2013.01); *G06T 1/20* (2013.01)
  USPC .......................................... 345/503; 718/105

(58) Field of Classification Search
  None
  See application file for complete search history.

(56) References Cited

U.S. PATENT DOCUMENTS

| | | | |
|---|---|---|---|
| 7,249,351 B1 * | 7/2007 | Songer et al. | 717/158 |
| 7,370,311 B1 * | 5/2008 | Pritchard et al. | 716/116 |
| 8,250,548 B2 * | 8/2012 | Kasahara et al. | 717/149 |
| 2009/0096481 A1 * | 4/2009 | Butter | 326/38 |
| 2009/0265691 A1 * | 10/2009 | Varadarajulu | 717/127 |

FOREIGN PATENT DOCUMENTS

CN    101236601 A    8/2008

* cited by examiner

*Primary Examiner* — Kee M Tung
*Assistant Examiner* — Frank Chen
(74) *Attorney, Agent, or Firm* — Martin & Associates; Derek P. Martin (57) ABSTRACT

An accelerator work allocation mechanism determines at runtime which functions to allocate to a hardware accelerator based on a defined accelerator policy, and based on an analysis performed at run-time. The analysis includes reading the accelerator policy, and determining whether a particular function satisfies the accelerator policy. If so, the function is allocated to the hardware accelerator. If not, the function is allocated to the processor.

10 Claims, 6 Drawing Sheets

| Accelerator Policy ||
|---|---|
| Function | Allocate to Hardware Accelerator |
| load | yes |
| parse | no |
| selectNodes | no |

FIG. 4

| Accelerator Policy ||
|---|---|
| Function | Allocate to Hardware Accelerator |
| load | Size > 100,000 bytes |
| parse | no |
| selectNodes | Number of Nodes > 20 |

| Execution Time on Processor ||
|---|---|
| Function | Time |
| load | 1.0 seconds |
| parse | 0.36 seconds |
| selectNodes | 0.74 seconds |

FIG. 8

| Execution Time on Hardware Accelerator ||
|---|---|
| Function | Time |
| load | 0.52 seconds |
| parse | 0.23 seconds |
| selectNodes | 0.80 seconds |

RUN-TIME ALLOCATION OF FUNCTIONS TO A HARDWARE ACCELERATOR

BACKGROUND

1. Technical Field

This disclosure generally relates to computer systems, and more specifically relates to use of hardware accelerators in computer systems.

2. Background Art

Hardware accelerators of various types have been developed to speed the execution of certain functions in a computer system. For example, graphics accelerators are well-known in the art, and allow graphic functions to be offloaded from the processor to a dedicated hardware accelerator that can perform the graphic functions in much less time than it would take the processor. Floating-point processors are another type of hardware accelerator that allows a processor to offload floating point operations. More recent developments have produced other types of hardware accelerators, including accelerators for processing eXtensible Markup Language (XML), accelerators for performing compression and decompression, and accelerators for performing encryption and decryption. As used herein, the term "hardware accelerator" extends to any hardware to which a processor may allocate functions to perform.

Figure 2:
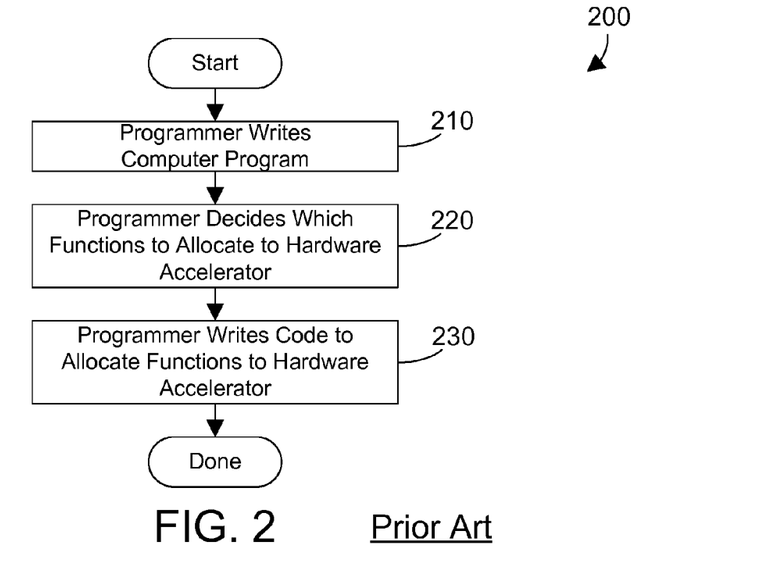
FIG. 2 is a flow diagram of a prior art method for determining at programming time which functions in a computer program are allocated to a hardware accelerator.

In the prior art, programmers were required to have knowledge that a hardware accelerator would be present in the system, and would then decide in the code which functions to allocate to the hardware accelerator. Referring to FIG. 2, a prior art method 200 shows such an approach. The programmer writes the computer program (step 210). The programmer decides which functions to allocate to the hardware accelerator (step 220). The programmer then writes the code to allocate functions to the hardware accelerator (step 230). Thus, in the prior art, all decisions regarding what functions are performed by the hardware accelerator are made by a human programmer at the time the programmer writes the code. The result is code that is inflexible and cannot fully take advantage of the hardware accelerator. Without a way to dynamically determine at run-time functions to allocate to a hardware accelerator, the performance of a computer system that has a hardware accelerator will not be optimized.

BRIEF SUMMARY

An accelerator work allocation mechanism determines at run-time which functions to allocate to a hardware accelerator based on a defined accelerator policy, and based on an analysis performed at run-time. The analysis includes reading the accelerator policy, and determining whether a particular function satisfies the accelerator policy. If so, the function is allocated to the hardware accelerator. If not, the function is allocated to the processor.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide an accelerator work allocation mechanism that determines at runtime which functions in a computer program to allocate to a hardware accelerator. The analysis includes reading the accelerator policy, and determining whether a particular function satisfies the accelerator policy. If so, the function is allocated to the hardware accelerator. If not, the function is allocated to the processor.

Figure 1:
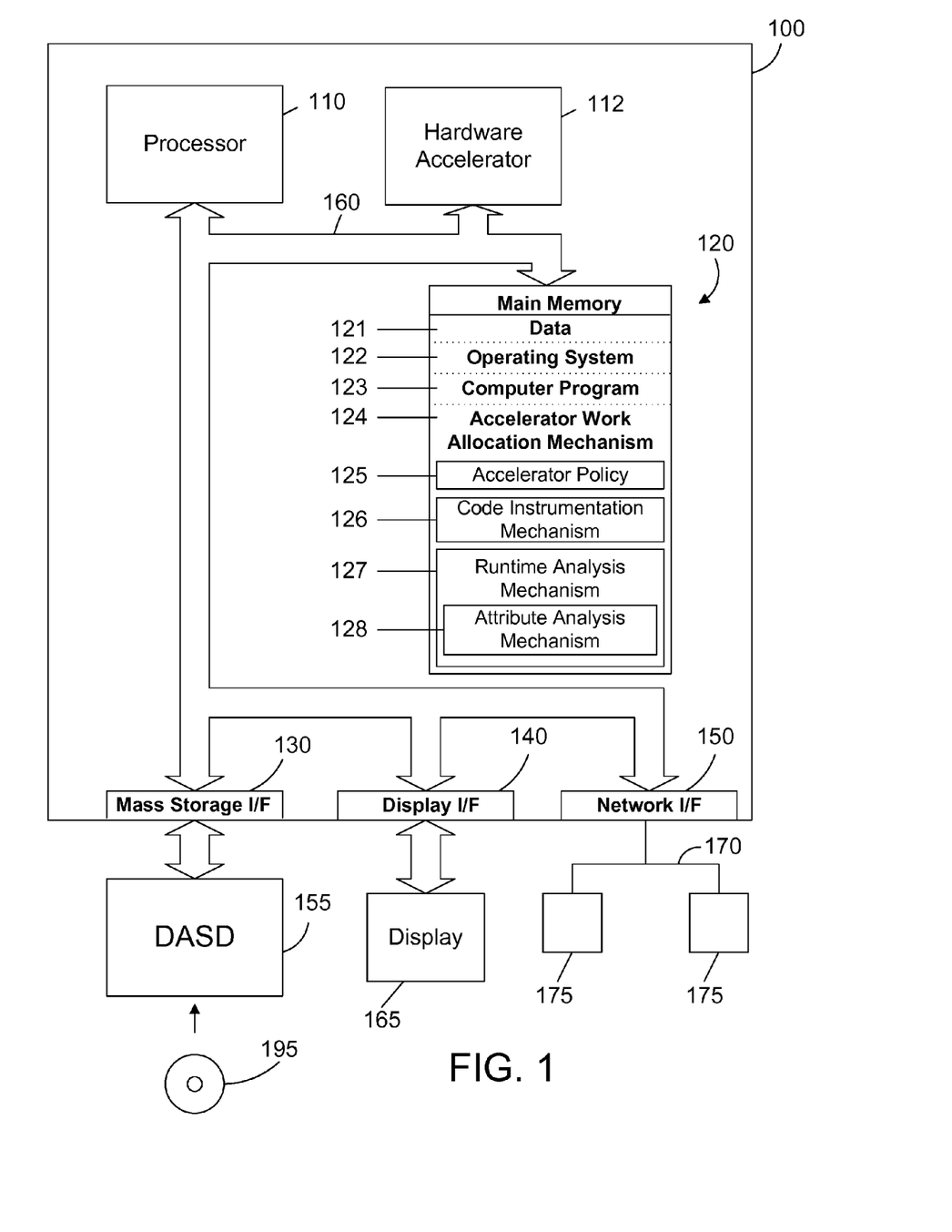
FIG. 1 is a block diagram of an apparatus that includes a hardware accelerator and an accelerator work allocation mechanism that determines at runtime which functions in a computer program to allocate to the hardware accelerator.

Referring to FIG. 1, a computer system 100 is one suitable implementation of a computer system that includes a hardware accelerator and an accelerator work allocation mechanism. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a hardware accelerator 112, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a computer program 123, and an accelerator work allocation mechanism 124. Data 121 represents any data that serves as input to or output from any program in computer system 100. Operating system 122 is a multitasking operating system. Computer program 123 is representative of any computer program that may have functions that could be allocated to the hardware accelerator 112. The accelerator work allocation mechanism 124 determines at runtime which functions in the computer program 123 to allocate to the hardware accelerator 112. The accelerator work allocation mechanism 124 includes an accelerator policy 125, a code instrumentation mechanism 126, and a runtime analysis mechanism 127. The accelerator policy 125 specifies criteria that determines when a function in the computer program 123 is allocated to the hardware accelerator 112. The code instrumentation mechanism 126 inserts instructions known as hooks into the computer program 123 so that runtime data may be collected. This runtime data may then be used by the accelerator work allocation mechanism to determine when to allocation a function in the computer program 123 to the hardware accelerator 112. The runtime analysis mechanism 127 performs analysis at runtime that allows the accelerator work allocation mechanism 124 to determine when to allocate a function in the computer program 123 to the hardware accelerator 112. The runtime analysis mechanism 128 includes an attribute analysis mechanism 128 that analyzes attributes of a function so the attributes may be taken into account in determining whether the function is allocated to the hardware accelerator 112. The attributes analyzed by the attribute analysis mechanism 128 may include, for example, parameters passed when the function is called. One suitable example of an attribute that the attribute analysis mechanism may take into account is the size of data being operated on by the function.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, computer program 123 and accelerator work allocation mechanism 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the computer program 123 and the accelerator work allocation mechanism 124.

Although computer system 100 is shown to contain only a single processor and a single system bus, those skilled in the art will appreciate that an accelerator work allocation mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As discussed in the Background Art section above, the prior art method 200 in FIG. 2 requires the programmer to make the decision while programming a computer program regarding which functions will be allocated to a hardware accelerator. This requires substantial knowledge and experience by the programmer. Furthermore, it is inflexible according to runtime conditions. For example, let's assume a programmer decides to allow an XML hardware accelerator to always do a "load" operation for XML files. While this may save time when large XML files are being loaded, if the majority of load operations are for small XML files that could be more efficiently handled by the processor, the selection by the programmer could actually hurt runtime performance. In addition, defining within a program which functions are allocated to a hardware accelerator allows no flexibility to adjust according to runtime conditions. These problems are solved by allocating functions to a hardware accelerator at runtime, as discussed in detail herein.

Figure 3:
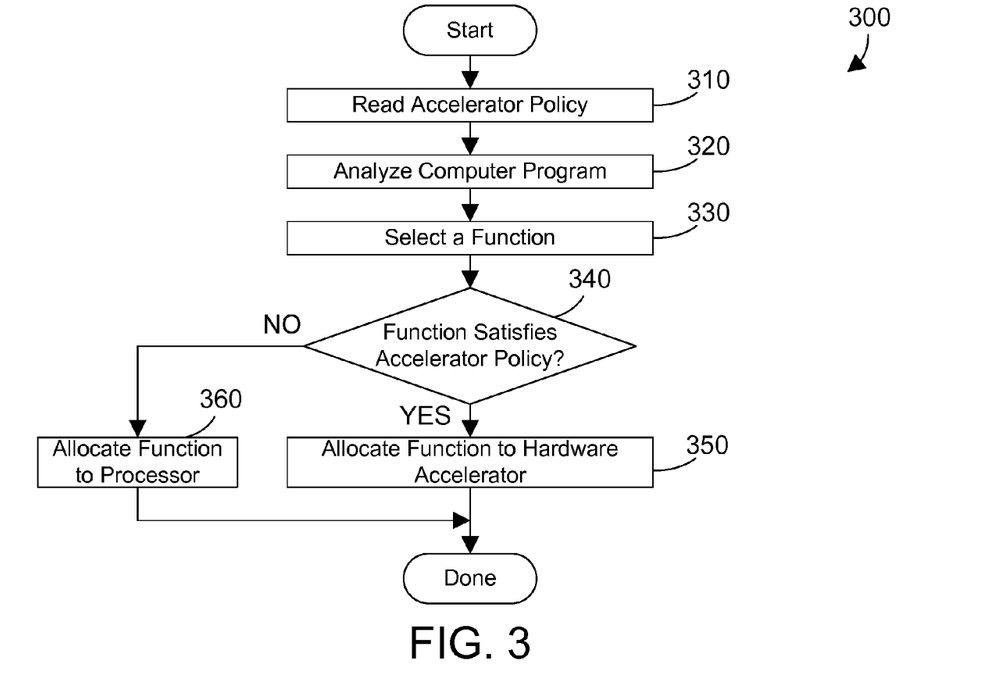
FIG. 3 is a flow diagram of a method for allocating at runtime functions in a computer program to a hardware accelerator.

Referring to FIG. 3, a method 300 is preferably performed by the accelerator work allocation mechanism 124 shown in FIG. 1. Method 300 begins by reading an accelerator policy (step 310). The accelerator policy is preferably defined by a programmer or user, and specifies criteria that allow the accelerator work allocation mechanism 124 to decide at runtime when to allocate functions to the hardware accelerator. The computer program is analyzed (step 320). A function is then selected (step 330). When the function satisfies the accelerator policy (step 340=YES), the function is allocated to the hardware accelerator (step 350). When the selected function does not satisfy the accelerator policy (step 340=NO), the function is allocated to the processor (step 360). In the most preferred implementation, no specific action needs to occur to allocate a function to the processor in step 360. All functions default to being executed by the processor, so if a function is not allocated to the hardware accelerator, this means the function will be executed by the processor, which means the function is allocated to the processor (step 360) simply by not allocating the function to the hardware accelerator. Note that steps 330-360 could be repeated for each function in the computer program that could potentially be allocated to the hardware accelerator.

Figure 4:
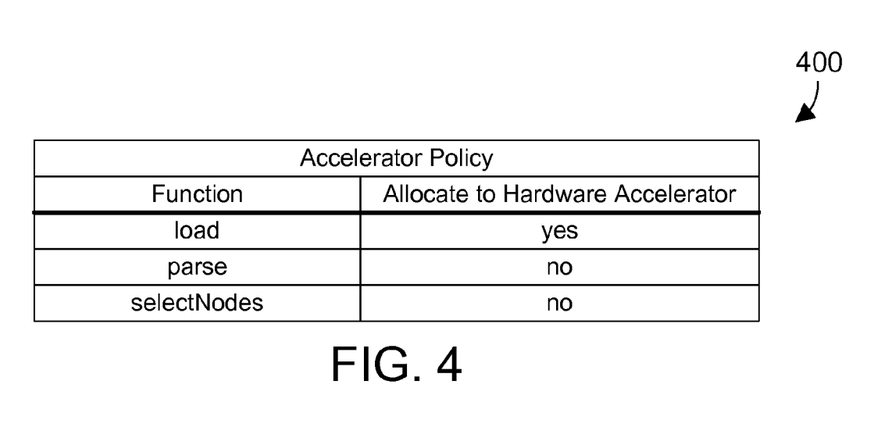
FIG. 4 is a table of a first sample accelerator policy.

Referring to FIG. 4, a first sample accelerator policy 400 specifies which functions to allocate to the hardware accelerator. The examples herein assume the hardware accelerator is an XML accelerator. The accelerator policy 400 in FIG. 4 specifies to allocate all XML load functions to the XML accelerator, and not to allocate XML parse and XML selectNodes functions to the XML accelerator. This simple sample accelerator policy 400 provides advantages over the prior art method of hard-coding allocations to the hardware accelerator in the code, because the accelerator policy may be changed without changing the program code. This allows a user of the computer program to change its function by simply changing the accelerator policy 400, without the need of changing and re-compiling the computer program.

Figure 5:
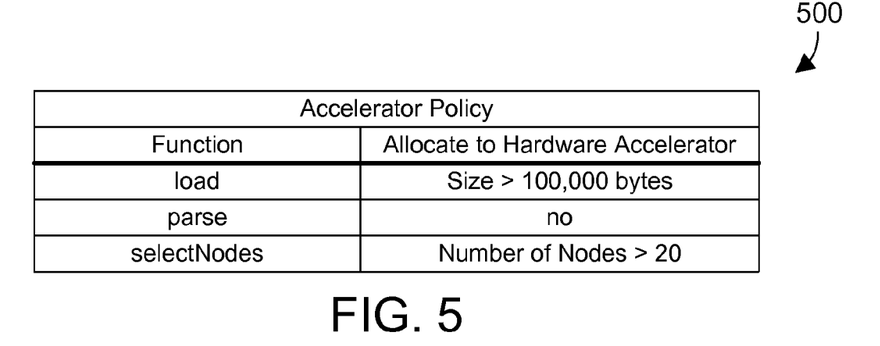
FIG. 5 is a table of a second sample accelerator policy.

Referring to FIG. 5, a second sample accelerator policy 500 includes heuristic expressions that allow more flexibility in determining which functions to allocate to a hardware accelerator at runtime. Thus, for an XML load function, the function is allocated to the XML accelerator when the size of the XML file being loaded is greater than 100,000 bytes. When the size of the XML file being loaded is 100,000 bytes or less, the load function is allocated to the processor. In similar fashion, the XML selectNodes function is allocated to the XML accelerator when the number of nodes in the document is greater than twenty, and is allocated to the processor when the number of nodes being selected is twenty or less. XML parse functions are not allocated to the hardware accelerator. While the logical expressions shown in FIG. 5 are simple, the concepts herein extend to any suitable criteria that could be specified in an accelerator policy, regardless of how simple or complex the criteria may be.

Figure 6:
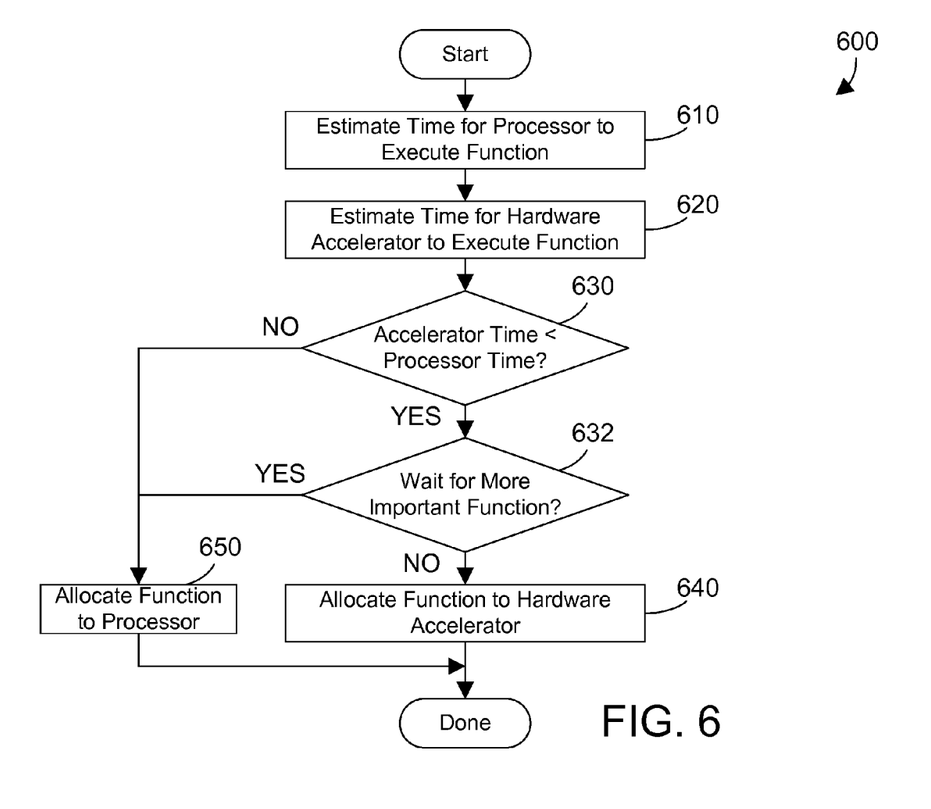
FIG. 6 is a flow diagram of a method for allocating functions to a hardware accelerator based on estimated execution time.

Referring to FIG. 6, method 600 is one suitable implementation of one specific method that is within the scope of the method 300 in FIG. 3. First, time for the processor to execute a function is determined (step 610). Next, the time for the hardware accelerator to execute the same function is determined (step 620). When the accelerator time is less than the processor time (step 630=YES), and there is no need to wait for a more important function (step 632=NO), the function is allocated to the hardware accelerator at runtime (step 640). When the accelerator time is not less than the processor time (step 630=NO), the function is allocated to the processor at runtime (step 650). When the accelerator time is less than the processor time (step 630=YES0, but there is a need to wait for a more important function (step 632=YES), the function is allocated to the processor (step 650). The concept of a "more important function" is described below with reference to FIG. 12. Note the time estimates in step 610 and 620 may be derived in any suitable way. One way is to estimate the times based on system resources such as number of processors, processor speed, memory size, etc. Another way is to estimate the times is based on actual execution times when the code is instrumented, as discussed in more detail below. In the most preferred implementation, the estimate of times for the hardware accelerator to perform its functions includes the extra time (overhead) it takes for the processor to off-load the work to the hardware accelerator.

Figure 7:
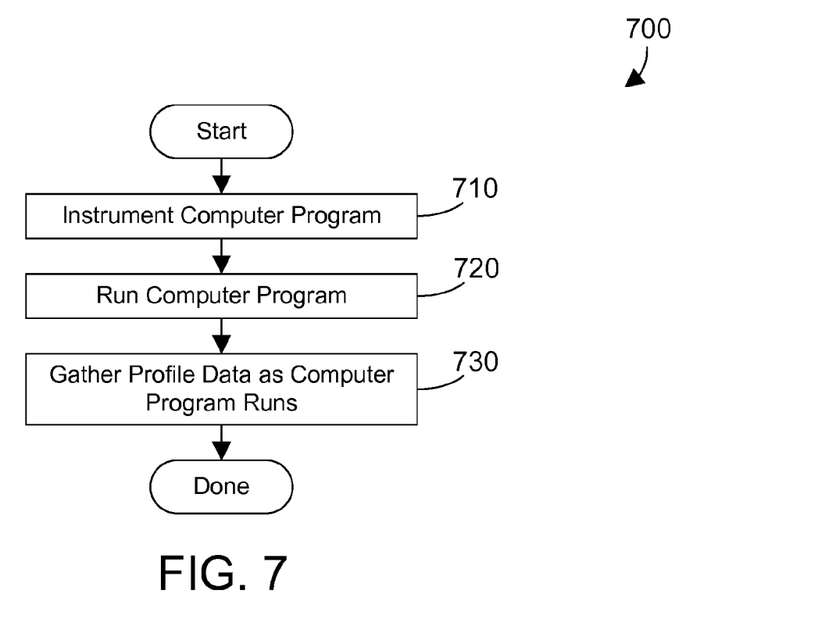
FIG. 7 is a flow diagram of a method for gathering profile data as a computer program runs.

Referring to FIG. 7, a method 700 begins by instrumenting the computer program (step 710). Instrumenting the computer program means inserting instructions called hooks into the computer program that allow collecting profile data as the computer program executes. Thus, all XML load instructions could be instrumented so the time it takes to perform each XML load instruction can be determined. Once the computer program is instrumented, the computer program is executed (step 720). The profile data generated from the execution of the computer program is gathered as the computer program runs (step 730). The profile data could include any suitable information, including the time it took to execute each function that was instrumented, the average time for executing each function that was instrumented, the range of times for executing each function that was instrumented, the attributes of each function, etc. Time for executing a function may then be estimated in steps 610 and 620 based on the profile data. Note the profiling could include one run with code that forces all functions to be performed by the processor, and a second run with code that causes some or all of the functions to be performed by the hardware accelerator. In the alternative, the profiling could include a single run with some of the functions performed by the processor and others performed by the hardware accelerator according to how the computer program is coded and instrumented.

Figure 8:
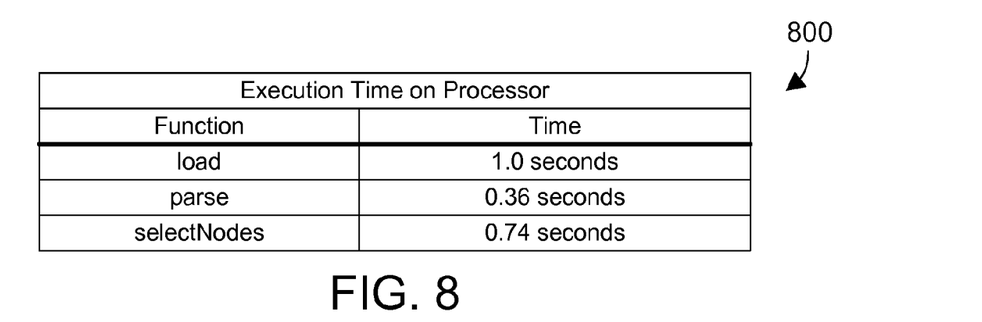
FIG. 8 is a table showing execution times for certain functions on the processor.
Figure 9:
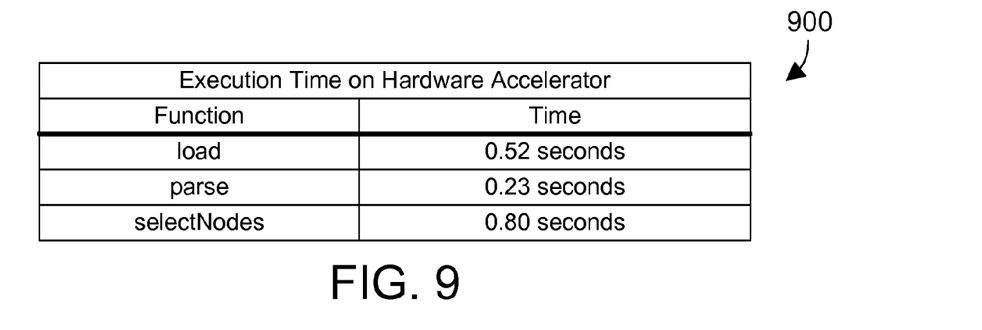
FIG. 9 is a table showing execution times for certain functions on the hardware accelerator.

Examples of estimates of executions times are shown in FIGS. 8 and 9. Referring to FIG. 8, the time to execute an XML load function by the processor is 1.0 seconds. The time to execute an XML parse function by the processor is 0.36 seconds. The time to execute an XML selectNodes function by the processor is 0.74 seconds. These estimated execution times are preferably derived from the profile data gathered as the instrumented computer program executes. Referring to FIG. 9, the time to execute an XML load function by the hardware accelerator is 0.52 seconds. The time to execute an XML parse function by the hardware accelerator is 0.23 seconds. The time to execute an XML selectNodes function by the hardware accelerator is 0.80 seconds.

Now we use the time estimates in FIGS. 8 and 9 with the method 600 in FIG. 6. The estimates in step 610 are shown in table 800 in FIG. 8. The estimates in step 620 are shown in table 900 in FIG. 9. For the XML load function, the accelerator time of 0.52 seconds is less than the processor time of 1.0 seconds (step 630=YES), so the XML load function is allocated to the hardware accelerator (step 640). For the XML parse function, the accelerator time of 0.23 seconds is less than the processor time of 0.36 seconds (step 630=YES), so the XML parse function is allocated to the hardware accelerator (step 640). For the XML selectNodes function, the accelerator time of 0.80 is greater than the processor time of 0.74 seconds (step 630=NO), so the XML selectNodes function is allocated to the processor (step 650). One might wonder why the selectNodes function would have an estimated execution time on the hardware accelerator that is greater than the estimated execution time on the processor. Allocating the function to the hardware accelerator requires some system overhead, so for functions that can be executed in about the same amount of time, the overall execution time for the hardware accelerator could be longer due to the overhead of allocating the function to the hardware accelerator and receiving the data from the hardware accelerator. In addition, the hardware accelerator may not perform well for some functions. As a result, the time estimates allow determining both when to allocate work to a hardware accelerator, and when not to allocate work to the hardware accelerator. For the purposes of this simple example, we assume the estimated execution times in table 900 in FIG. 9 include the system overhead for allocating the function to the hardware accelerator and receiving the data from the hardware accelerator.

Figure 10:
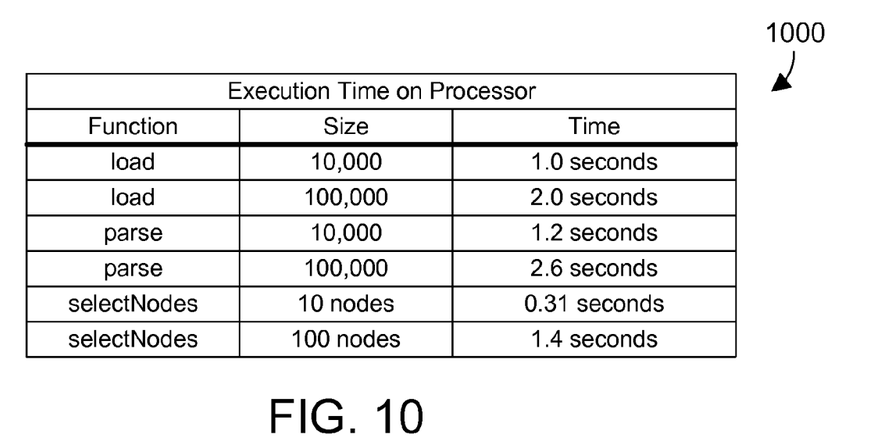
FIG. 10 is a table showing execution times on the processor for certain functions on the processor depending on size of the data being operated on by the function.
Figure 11:
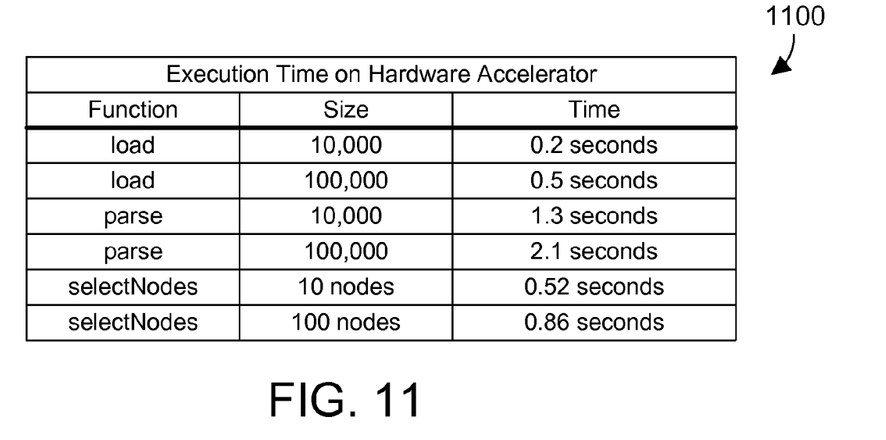
FIG. 11 is a table showing execution times on the hardware accelerator for certain functions on the processor depending on size of the data being operated on by the function.

Other attributes could be taken into account when making the decision of whether or not to allocate a function to a hardware accelerator. For example, for an XML accelerator, the size of the XML file being processed may greatly affect the time required to perform an XML function. FIG. 10 shows a table 1000 that shows estimates of execution times for XML load and parse functions on the processor as a function of the size of the XML file being processed, and for an XML selectNodes function on the processor as a function of the number of nodes being processed. Similarly, FIG. 11 shows estimates of execution times for XML load and parse functions on the hardware accelerator as a function of the size of the XML file being processed, and for an XML selectNodes function on the hardware accelerator as a function of the number of nodes being processed. With these enhanced estimates according to attributes of the function, the accelerator work allocation mechanism can make more intelligent decisions regarding when to allocate at runtime functions to a hardware accelerator.

Figure 12:
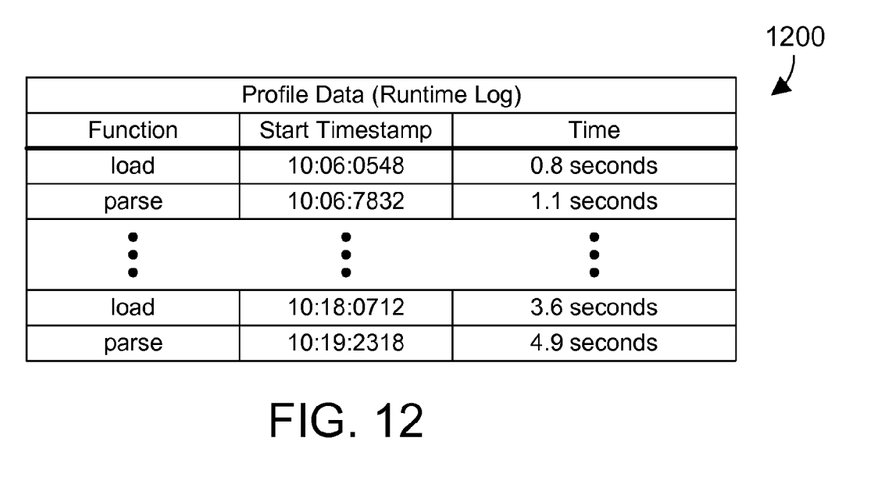
FIG. 12 is a sample log of profile data that may be used to determine what functions to allocate at runtime to a hardware accelerator.

Referring to FIG. 12, a table 1200 shows sample profile data in the form of a runtime log. The table 1200 includes a list of functions, the timestamp of when the function started, and the time it took for the function to execute. This data could be used by the accelerator work allocation mechanism to further optimize the usage of the hardware accelerator. For example, we see from the sample profile data shown in FIG. 12 that an XML load instruction is often followed by an XML parse instruction. The accelerator work allocation mechanism could analyze the profile data in the runtime log in table 1200, and make decisions regarding which functions to allocate to the hardware accelerator. For example, using method 600 in FIG. 6, the load function would always be allocated to the hardware accelerator. Note, however, the start timestamps are such that the parse function occurs before the hardware accelerator could finish the preceding load instruction. The accelerator work allocation mechanism could determine based on the runtime log it would be more beneficial to process the load function with the processor so the hardware accelerator is available to perform the parse functions without waiting. In this sense, the parse function would be a more important function to allocate to the hardware accelerator than the load function. As a result, the load function would be allocated to the processor while the more important parse function is allocated to the hardware accelerator. In another example, the runtime log might reveal a frequency of calls from many different threads that results in much greater benefit in skipping a function that might normally be allocated to a hardware accelerator in favor of another function that will benefit more. The accelerator work allocation mechanism may thus detect one or more patterns in the profile data that affect the decision of when to allocate a function in the computer program to the hardware accelerator. The disclosure and claims herein expressly extend to any suitable way to analyze profile data to determine how best to optimize the usage of the hardware accelerator so the performance of the computer program is maximized.

While the specific examples herein relate to an XML hardware accelerator, the principles herein apply equally to any suitable hardware accelerator, including without limitation a math accelerator, a graphics accelerator, a compression/decompression accelerator, and an encryption/decryption accelerator. Note also while a single hardware accelerator 112 is shown in FIG. 1, the disclosure and claims herein expressly extend to the use of multiple hardware accelerators as well.

The disclosure and claims are directed to an accelerator work allocation mechanism that determines at run-time which functions to allocate to a hardware accelerator based on a defined accelerator policy, and based on an analysis performed at run-time. The analysis includes reading the accelerator policy, and determining whether a particular function satisfies the accelerator policy. If so, the function is allocated to the hardware accelerator. If not, the function is allocated to the processor.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method performed by at least one processor when executing an accelerator work allocation mechanism for allocating work to a hardware accelerator in a first runtime of a computer program in a computer system that includes the hardware accelerator and at least one processor executing the computer program in the first runtime, the method comprising the steps of:
   reading an accelerator policy included within the accelerator work allocation mechanism that specifies criteria that determines when a function is allocated to the hardware accelerator;
   analyzing the computer program;
   allocating during a first runtime of the computer program the function in the computer program to the hardware accelerator when the criteria in the accelerator policy is satisfied based on processor estimates of performance for the function and hardware accelerator estimates of performance for the function; and
   executing by the hardware accelerator the function during the first runtime of the computer program.

2. The method of claim 1 wherein the criteria in the accelerator policy includes at least one attribute of the function.

3. The method of claim 2 wherein the at least one attribute includes size of the file.

4. The method of claim 1 further comprising the steps of:
   inserting a plurality of instructions into the computer program that provide profile data when the computer program is executed; and
   deriving the processor estimates of performance for the function and the hardware accelerator estimates of performance for the function from the profile data.

5. The method of claim 4 further comprising the step of performing analysis of the profile data to optimize allocation of the function to the hardware accelerator.

6. The method of claim 1 further comprising the step of allocating the function to the hardware accelerator when the hardware accelerator estimates of performance for the function are less than the processor estimates of performance for the function.

7. The method of claim 1 further comprising the step of not allocating the function to the hardware accelerator when allocating a subsequent function to the hardware accelerator would have greater benefit to the performance of the apparatus and when allocating the function to the hardware accelerator would interfere with allocating the subsequent function to the hardware accelerator.

8. A computer-implemented method performed by at least one processor when executing an accelerator work allocation mechanism for allocating work to a hardware accelerator in a first runtime of a computer program in a computer system that includes the hardware accelerator and at least one processor executing the computer program in the first runtime, the method comprising the steps of:
   reading an accelerator policy included within the accelerator work allocation mechanism that specifies criteria that determines when a function is allocated to the hardware accelerator, the criteria including size of a file operated on by the function;
   analyzing the computer program;
   inserting a plurality of instructions into the computer program that provide profile data when the computer program is executed;
   deriving processor estimates of performance for the function and hardware accelerator estimates of performance for the function from the profile data;
   analyzing the profile data to determine at least one pattern in the profile data;
   allocating during a first runtime of the computer program the function in the computer program to the hardware accelerator when the hardware accelerator estimates of performance for the function are less than the processor estimates of performance for the function and the at least one pattern satisfies the accelerator policy; and
   executing by the hardware accelerator the function during the first runtime of the computer program.

9. A computer-implemented method performed by at least one processor when executing an accelerator work allocation mechanism for allocating work to a hardware accelerator in a first runtime of a computer program in a computer system that includes the hardware accelerator and at least one processor executing the computer program in the first runtime, the method comprising the steps of:
   reading an accelerator policy included within the accelerator work allocation mechanism that specifies criteria that determines when a function is allocated to the hardware accelerator, wherein the criteria in the accelerator policy includes size of a file operated on by the function;
   analyzing the computer program;
   inserting a plurality of instructions into the computer program that provide profile data when the computer program is executed;
   deriving the processor estimates of performance for the function and the hardware accelerator estimates of performance for the function from the profile data;
   performing analysis of the profile data to optimize allocation of the function to the hardware accelerator;
   allocating at runtime the function in the computer program to the hardware accelerator when the hardware accelerator estimates of performance for the function are less than the processor estimates of performance for the function; and
   not allocating the function to the hardware accelerator when allocating a subsequent function to the hardware accelerator would have greater benefit to the performance of the apparatus and when allocating the function to the hardware accelerator would interfere with allocating the subsequent function to the hardware accelerator.

10. The method of claim 9 further comprising the step executing by the hardware accelerator the function during the same runtime when the accelerator work allocation mechanism allocates the function to the hardware accelerator.

* * * * *